Jan. 6, 1970  S. F. J. ROSBERG  3,487,488
MACHINES FOR FORM MILLING OF SHOE SOLES AND HEELS
Filed Oct. 17, 1967  6 Sheets-Sheet 1

INVENTOR:
SVEN F. J. ROSBERG
Brown, Schlesser+Burridge
ATTORNEYS

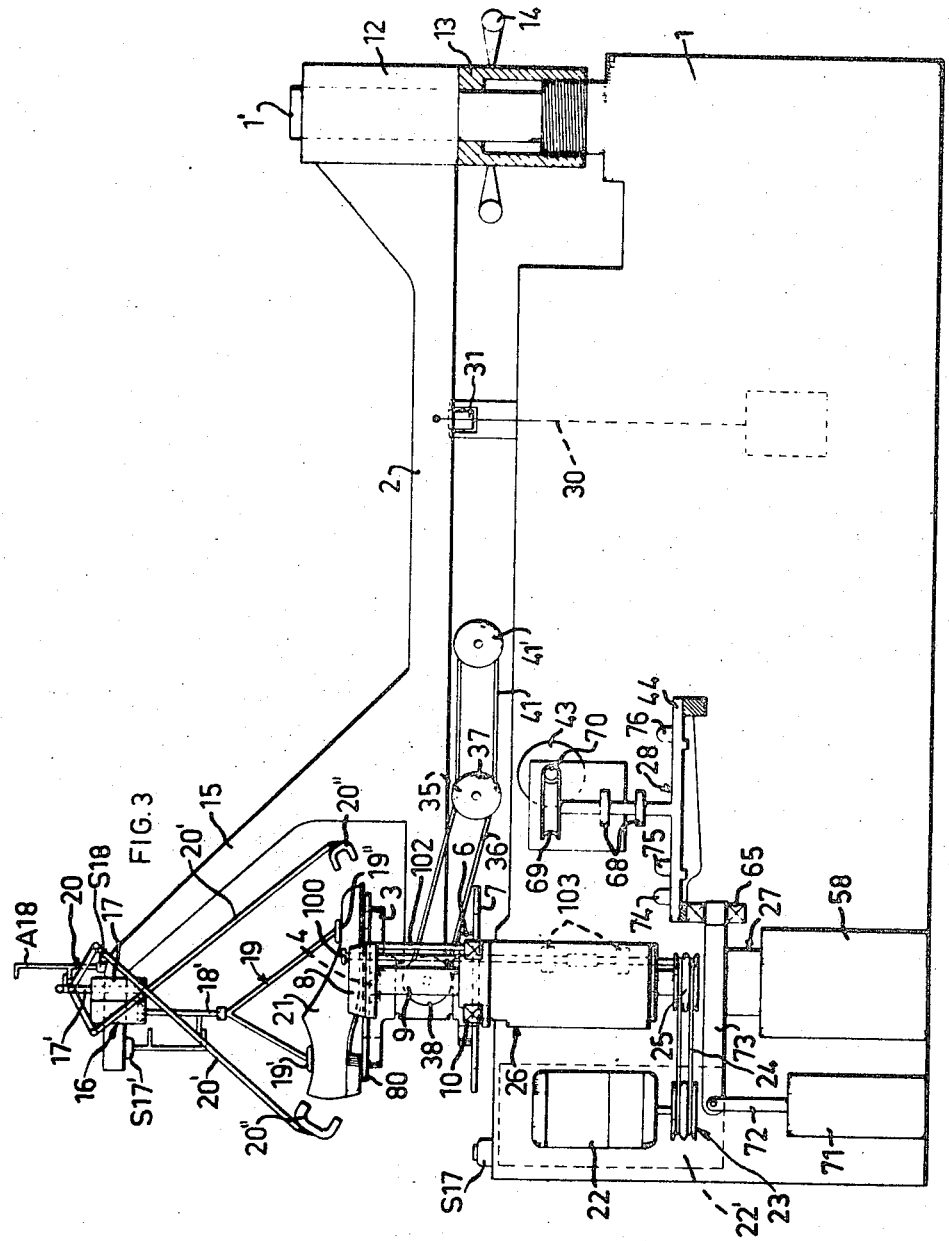

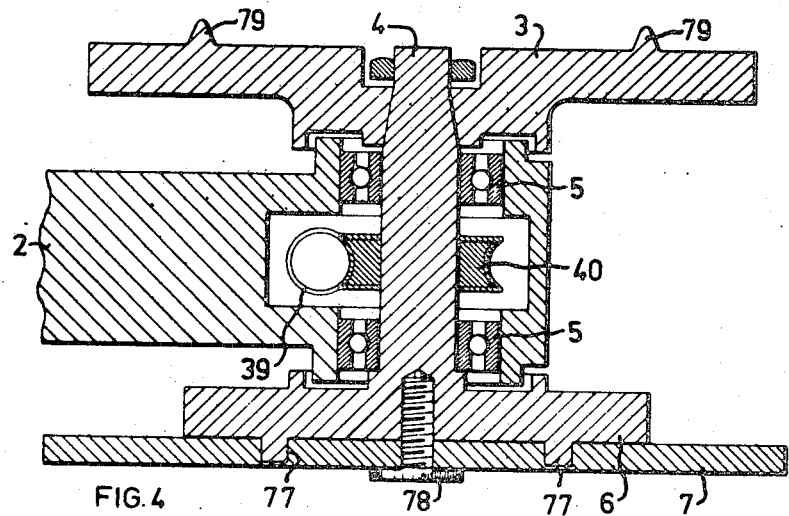
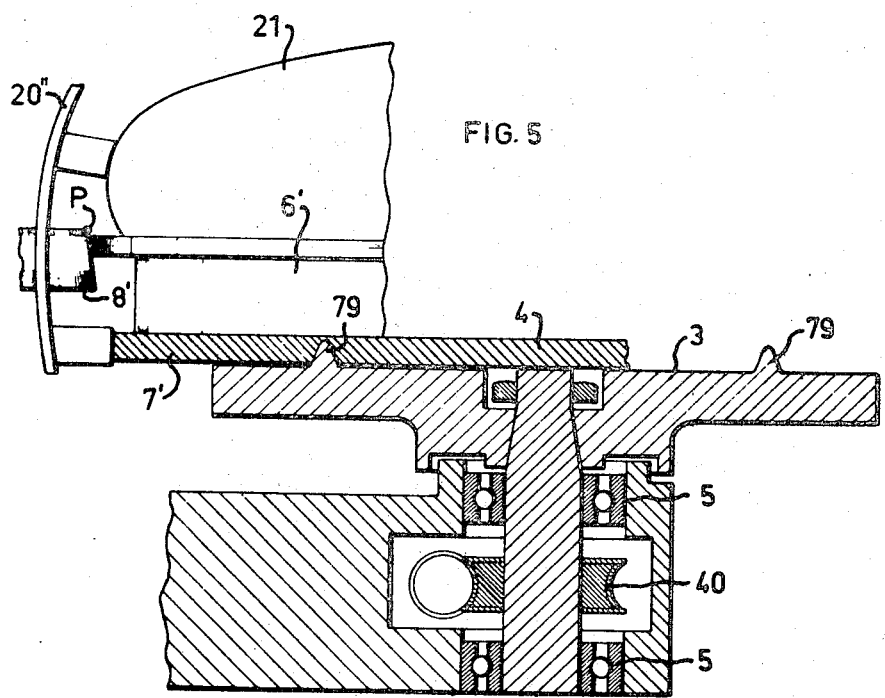

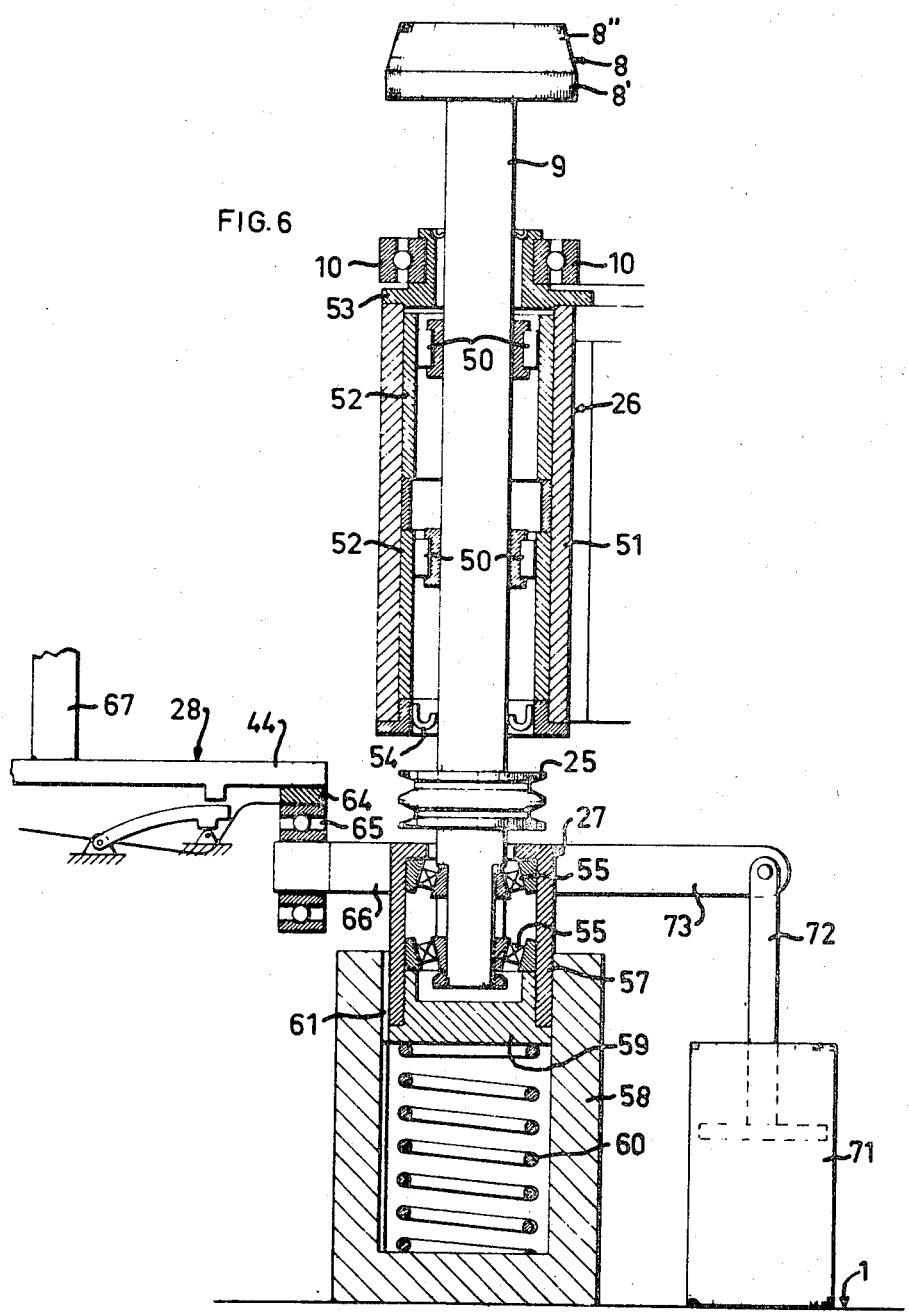

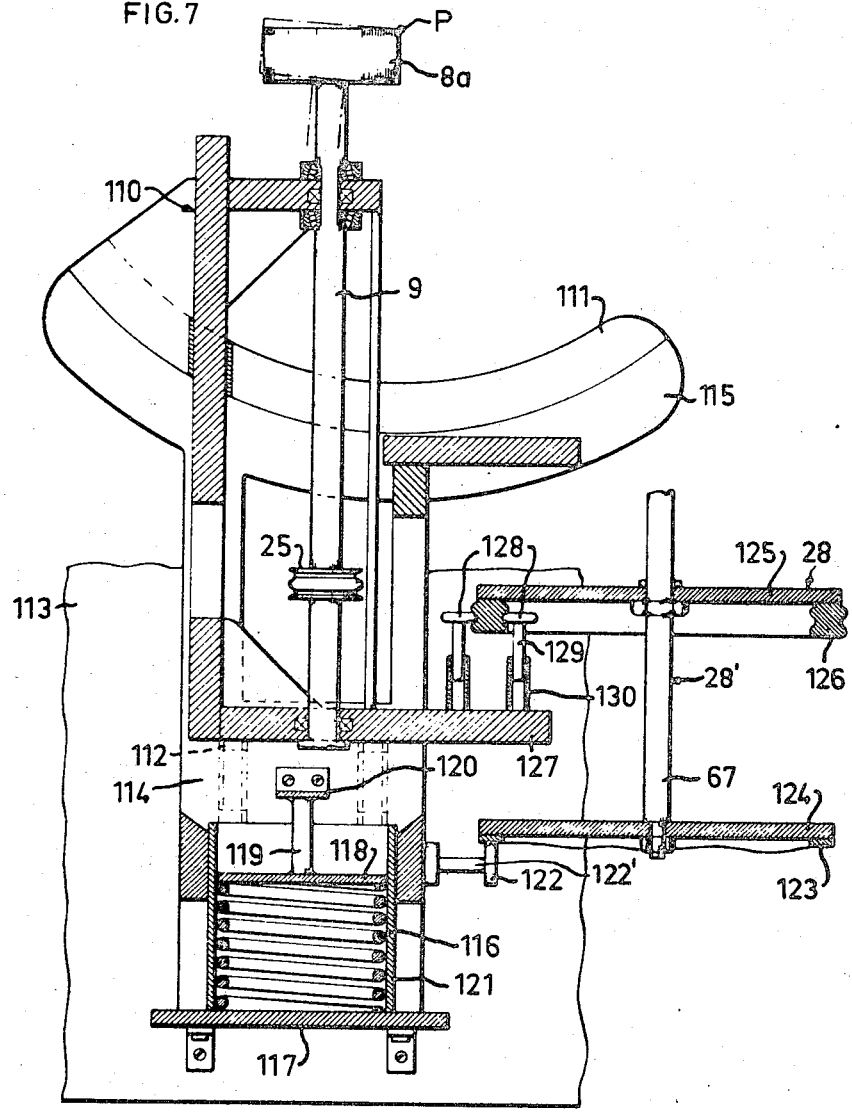

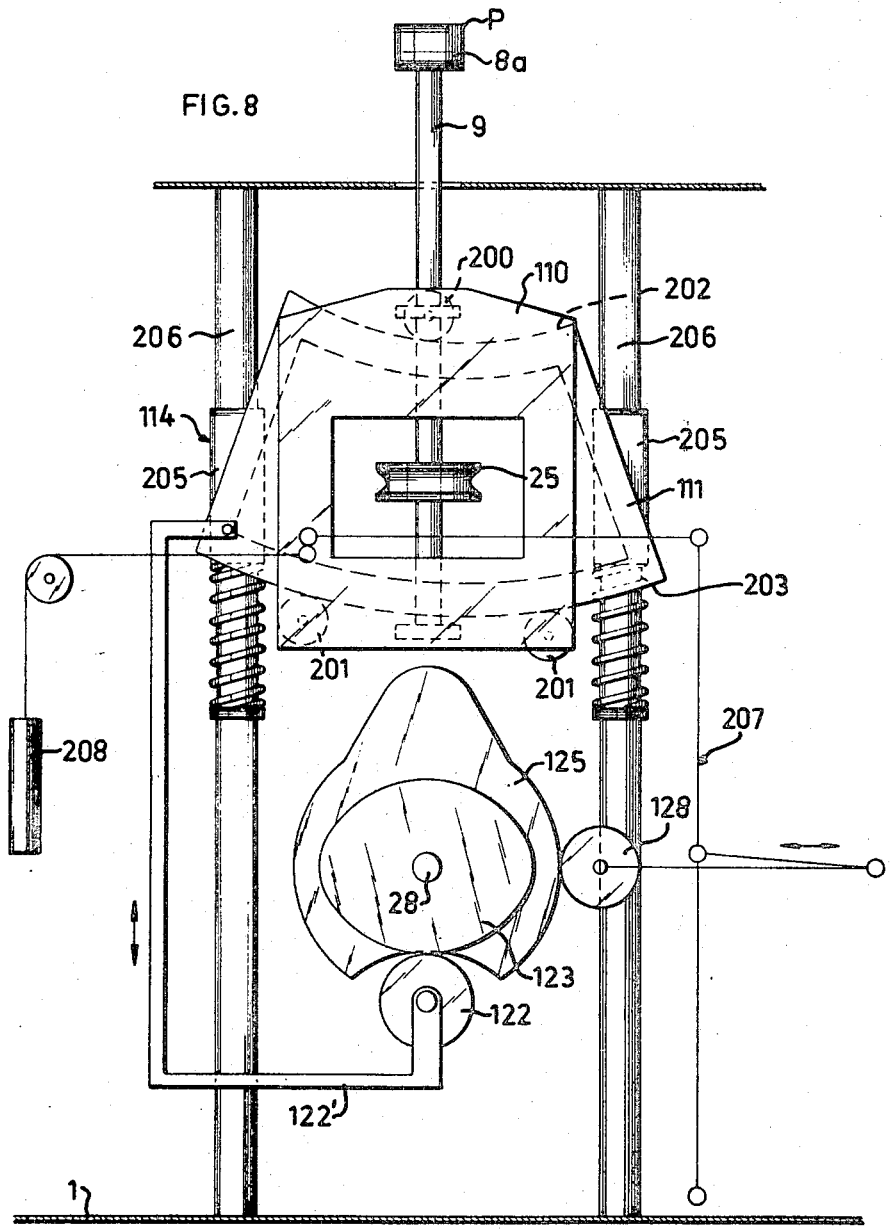

United States Patent Office 3,487,488
Patented Jan. 6, 1970

3,487,488
MACHINES FOR FORM MILLING OF SHOE
SOLES AND HEELS
Sven Fredrick Johan Rosberg, Vinkelgatan 15,
Klavrestrom, Sverige, Sweden
Filed Oct. 17, 1967, Ser. No. 675,952
Int. Cl. A43d 27/00
U.S. Cl. 12—86.7                    14 Claims

ABSTRACT OF THE DISCLOSURE

Machine with a tool supporting spindle and a rotatable work table for controlled contouring, e.g. form milling, of material such as sheets, plates, boards, slabs, panes or strips of leather, rubber, wood, plastic or other workable material, especially but not excluding a working machine for contouring soles and heels mounted on shoes, in a continuous process in which the spindle during the working process is to be displaced or displaced and tilted in relation to the workpiece in timed relationship with the rotation of the work table.

---

This invention relates generally to machine tools and more particularly to an improved working machine for contouring materials.

It is a general object of the present invention to provide a working machine for contouring workpieces by form milling operations such as form milling of strip materials, and it therefore is a specific object of the invention to provide a working machine for form milling of the edegs of the sole and heel of a shoe in connection with the manufacture or repair of shoes in a continuous process with a minimum of manual work and supervision.

Another object of the present invention is to provide a form milling machine having a rotary spindle for supporting a tool and a working table for supporting the workpiece with a new mechanism adapted to operate the spindle and the working table relative to each other so as to permit the workpiece to be contoured in a continuous form milling process for the trimming or shaving of the marginal portions of the workpiece.

A further object of the present invention is to provide a form milling machine for contouring workpieces such as the sole and heel of a shoe with a milling tool supported by a rotary spindle and a working table for supporting the workpiece, in which the working table is movably supported by a machine frame for transversal and rotary movement in relation to the tool supported by the spindle, and with a new cam mechanism for the control of the rotary movement of the working table in relation to the tool in a continuous form milling process for the trimming or shaving of the edge or marginal portions of plates, e.g. the sole and heel of a shoe, and other materials such as sheets, plates, boards, slabs or panes of leather, rubber, wood, plastic or other workable materials.

According to this invention, an improved milling machine having a spindle rotatably supported by the machine frame, and a tool supported by the spindle for performing a form milling operation on a workpiece comprises a work table rotatably supported by the machine frame for supporting the workpiece, and a device for clamping the workpiece on the table, supporting means for supporting the table and the sprindle movably in relation to each other and control means including drive means and template means for effecting controlled rotational movements of said table and for bringing the tool supported by the spindle in controlled engagement with the workpiece for effecting a form milling operation thereon in dependence on the contour of the template means and thereby in coordination with the rotation of the table.

This control device includes, according to a preferred construction, circular cam surfaces whose common center is situated at a point of the milling tool, preferably at the outer edge of the milling tool at the face thereof turned towards the workpiece.

Further, the machine includes a device for lateral control of the work table in relation to the milling tool, which device consists of a rotary template support connected with the work table and having means for removably clamping exchangeable templates corresponding to the profile intended for the workpiece, e.g. the sole and heel of a shoe, and a rotary cam follower which is supported by the machine frame in a position close to the edge of the template for lateral control of the working table in relation to the milling tool during the rotary movement of the table.

These and other objects of this invention, which will become more fully apparent from the following detailed description, may be achieved by means of the exemplifying apparatus depicted and set forth in this specification in conjunction with the accompaniyng drawings, in which:

FIGURE 3 is an enlarged diagrammatic side elevation, partly in vertical section, of the machine in FIGURE 1 illustrating the working members of the machine and a slightly modified frame structure;

FIGURE 4 is a vertical section on a larger scale of the working table and template supports and illustrates the worm gear for the driving of the table;

FIGURE 5 illustrates a modification of the device in FIGURE 4;

FIGURE 6 is an axial section, partly in vertical elevation, of the spindle and its mounting means and of the device for vertical steering of the spindle according to the invention;

FIGURE 7 is a similar view of a modification of the device in FIGURE 6;

FIGURE 8 is a similar view of a further modification of the device in FIGURE 6.

Figure 1:
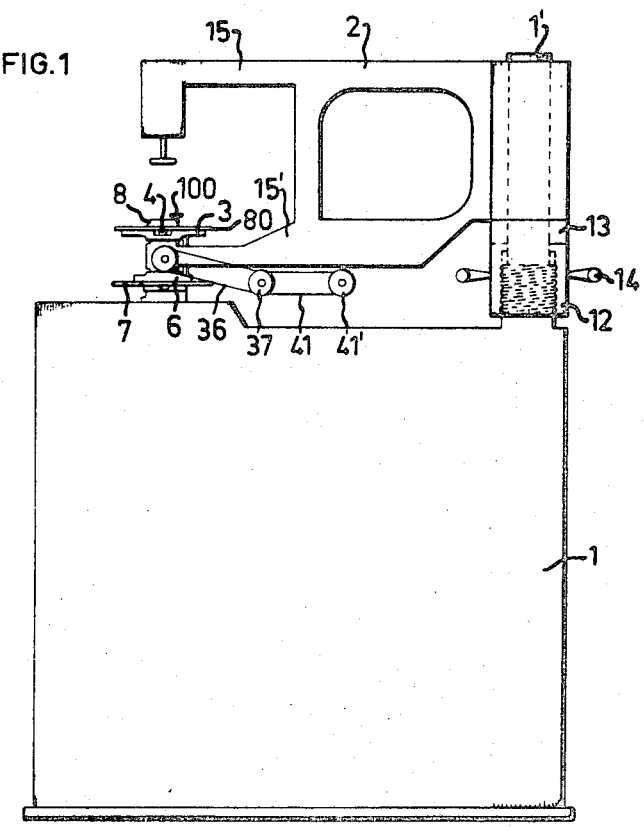
FIGURE 1 is a diagrammatic side elevation of a form milling machine incorporating the features of the present invention.
Figure 2:
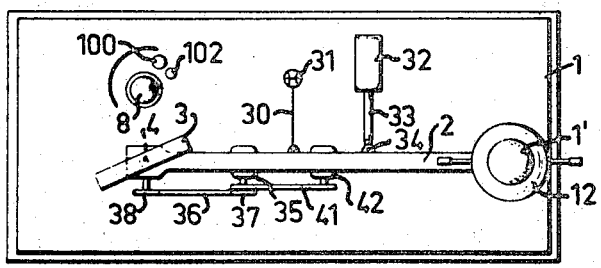
FIGURE 2 is a plan view of the machine in FIGURE 1.

As diagrammatically illustrated in FIGURES 1 and 2, the machine includes a frame or base generally designated 1 and having a vertical column 1'. The column 1' supports a substantially horizontal cantilever structure 2 which is mounted on the column 1' for pivotal movement on the vertical axis thereof. The cantilever structure 2 has a forked outer end formed by an upper arm 15 and a lower arm 15' which project from the main portion of the cantilever structure 2. The cantilever structure supports at its upper arm 15 a workpiece clamping means generally designated 16 and supports at its lower arm 15' a working table 3 adapted to form a rotary support for a workpiece, e.g. as shown in the form of a shoe, during a form milling operation. To this end the table 3 is mounted on a preferably conical end portion of a vertical shaft 4 rotatably mounted in the arm portion 15' by means of two ball bearings 5 (FIGURE 4). The shaft 4 at its lower end supports a template support 6 which in FIGURE 4 is shown as integral with the shaft 4. The template support 6 has secured to its underneath side (see FIGURE 4) an exchangeable template 7 for lateral control of the working table 3 in relation to a tool, e.g. as shown in the form of a milling tool 8 which is mounted on a vertical spindle 9 which in turn is rotatably mounted in the frame structure 1 as will be described later. The template 7 is adapted to have its edge surface in engagement with a cam follower, preferably a cam follower in the form of a roller 10, which cam follower 10 as shown can be the outer race of a ball bearing whose inner race is secured to a bearing housing 26 (FIGURE 6) for the spindle.

The cantilever structure 2 in order to permit pivotal movement thereof on the vertical axis of the column 1', has at its inner end of sleeve portion 12 which surrounds the column 1' and is seated with its bottom end on the top end of an internally threaded spacing sleeve 13 mounted on the lower part of the column 1' in engagement at its lower end with threads formed on the column 1'. The sleeve 13 has at its upper end an inwardly projecting flange which slidably bears against the column. These means permit adjustment of the vertical position of the cantilever structure 2 along the column, which adjustment is effectuable by turning a handle 14 connected to the sleeve 13.

As best shown in FIGURE 3, the workpiece clamping means 15 which is supported by the cantilever structure 2 at a substantially horizontal end portion of its upper arm 15 includes two fluid operated cylinders 17, 18. The piston rod 18' extending from the piston in the cylinder 18 supports a clamping means generally designated 19, and the piston rod 17' extending from the piston in the cylinder 17 is connected to a gripping means 20. A shoe 21 which represents the workpiece and is supported on the table 3, is adapted to be clamped by the clamping means 19 against said table 3 upon actuation of the cylinder 18 for displacing the piston rod 18' downwardly, and the gripping means 20 serves the purpose of positioning the shoe into an exact position on the table 3 before the clamping means 19 is actuated. The gripping means 20 can be of any suitable construction apt to perform this function but is preferably arranged to be brought into engagement with the shoe 21 as well as with a reference such as the template 7 in at least two points. These clamping and gripping means are described more in detail in the following.

A motor 22 clamped to the machine frame is arranged to rotate the spindle 9 via a conventional V-belt and pulley transmission generally designated 23 (FIGURE 3).

An important feature of this invention resides in means for permitting controlled vertical movements of the spindle 9 and means for controlling such movements to thereby effect adjustment of the vertical position of the tool 8 in dependence on the actual form of the workpiece and the special machining that is desirable to perform. In the following the machine will be described with reference to FIGURES 1–3 as a machine for form milling of the edges of the soles and heels of shoes, such as the shoe 21, but it is understood that the machine is also adapted for milling, shaving or grinding etc. a workpiece of any suitable kind that is clamped on the table 3.

To this end the spindle 9 is movably supported in the direction of its longitudinal axis to permit the tool 8 to follow the slopes of the edge of the sole and heel of the shoe 21 during a form milling operation. Thus, the spindle 9 is rotatably mounted in a bearing housing 26 supported in the machine frame 1 and is vertically movably supported by a mounting device generally designated 27, while the vertical movement of the spindle 9 is controlled by a cam mechanism generally designated 28. These important parts of the machine will be more fully described in the following.

In order to keep the shoe 21 on the table 3 in engagement with the tool 8 in the form milling operation the pivot arm 2 is actuated in the transversal direction towards the tool by transversal actuating means such as shown in the form of a preload 30' depending from and fixed at one end of a line 30 the other end of which is secured to the arm 2 while the line between the arm 2 and the preload 30' is passed around an idler roller 31 mounted on a bracket 31' secured to the machine frame 1. To control the transversal movement of the arm 2 in the direction of tool 8 and to withdraw the arm from the tool and to bring the tool out of contact with the shoe after completion of the form milling operation use is made of a fluid cylinder 32 which is pivoted to the machine frame 1 and the piston rod 33 of which is pivoted to the arm by a pivot at 34, as is best shown in FIGURE 2.

In a form milling operation the table 3 and template support 6 are rotated in unison a complete turn by means of a drive motor 35 preferably via a toothed belt and pulley transmission (FIGURE 3) including a belt 36 which extends over a toothed pulley 37 secured to the output shaft of the motor 35 and over a toothed pulley 38 which is mounted on the worm screw 39 of a worm gear train (FIGURE 4) having a worm wheel 40 mounted on the table shaft 4. The motor 35 which is mounted on the cantilever arm structure 2 is coupled by a synchro or other servo system to the cam mechanism 28. In FIGURE 3 the servo system is shown as comprising a synchro motor 42 mounted on the arm structure 2 and having a toothed pulley 41 which by a toothed belt 41' is coupled to the motor 35 and is electrically connected to another synchro motor 43 mounted on the machine frame or base 1 and having a shaft which supports a cam disk 44 forming part of the cam mechanism 28. By means of this servo system comprising the synchro motors 42, 43 and the toothed belt and pulley transmission 41, 41' exact actuation of the cam mechanism 18 is provided for the above mentioned control of the vertical movement of the spindle 9 and the tool 8 in exact synchronism with the movement of the template 7 and table 3 during the form milling operation as will be understood by the following.

As clearly shown in FIGURE 6 the spindle 9 is rotatably mounted in the bearing housing 26 by means of two spaced apart roller bearings 50 the inner races of which are secured to the spindle 9 at suitable axial distances from each other and beneath the ball bearing, the outer race of which is mentioned serves as a cam follower 10 for controlling the lateral movement of the table 3 by following the edge contours of the template 7 during the rotation of the latter a complete turn in the form milling operation. The outer races of the bearings 50 consist of a common sleeve or, as shown, of two separate sleeves 52 secured to the inner side of the tubular casing 26. Each sleeve 52 has a sufficient length to permit the necessary axial displacement or vertical movement of the spindle 9 for the desired movement of the tool 8 in opposite vertical directions for milling different portions of the sole and particularly at the transition from milling of the sole to milling of the heel, and vice versa, of the shoe 21. The tubular casing 26 is closed at the top by a cover ring 53 which is secured to the machine frame 1 and serves as a support for the casing 26 and the cam follower 10. The casing 26 at the bottom end is closed by a sealing device 54 arranged to slide on the spindle 9 to permit sealing thereof in spite of the controlled longitudinal displacements and rotation of the spindle.

The lower mounting 27 for the spindle 9 comprises two radial and axial roller bearings 55 the inner races of which are secured to a stepped lower end portion of the spindle 9, and outer races are secured to the inner side of a sleeve 57 received with its lower end portion in a casing 58 secured to the machine frame. The sleeve 57 is closed at its lower end by an end cap 59 which rests in the casing 58 upon a coil spring 60. To prevent rotation of the sleeve 57 in the casing 58 said sleeve and casing are splined as shown at 61.

The cam mechanism 28 includes, as best shown in FIGURES 3 and 6, a cam disk 44 which is supported by a rotatable shaft 67 adapted to be driven by the synchro motor 43 and having at its underneath side at the outer marginal portion thereof cam means 64 illustrated as an annular flange portion of the outer periphery of which forms a cam surface with a contour selected to effect the controlled axial movement of the spindle 9 in dependence on the sloped contour of the edges of the sole and heel of the shoe 21, i.e. the distance or high level of said edges in relation to the upper surface of the table 3. This cam surface engages a cam follower in the form of a roller 64, preferably like the roller 10 in the form of the outer race of a ball bearing mounted on an arm 66. The arm 64 which is connected to the spindle 9 preferably by being fixed to the housing 57 as shown in FIGURE 3, is adapted to urge the spindle 9 more and less downwardly against the action of the spring 60 in dependence on the movement of the cam follower 65 in contact with the cam surface on the cam 64, while the spring 60 which is inserted under bias between the bottom of the casing 58 and the cap 59 of the sleeve 57 while maintaining the cam follower 65 engaged with the cam 64, tends to move the spindle in the housing 26 upwardly. The shaft 67 on which the cam disk 44 is supported is rotatably mounted in vertical position by bearing means 68 (FIGURE 3) secured to the machine frame 1 and is connected with the output shaft of the synchro motor 43 by a gear preferably consisting of a worm wheel 69 on the shaft 67 and a worm screw 70 mounted on the output shaft of the motor 43. The gear 69, 70, when driven by the motor 43 which is controlled by the synchro motor 42, is adapted to rotate the disk 44 with the same speed as that of the table 3 which is rotated by the motor 35. To assist the spring 60 or in its place use can be made of an air spring in the form of a pneumatic cylinder 71 connected to and preloaded by a source of compressed air (not shown). This cylinder 71 can be housed in the outer casing 58, but in the illustrated embodiment it is mounted on the machine frame 1 and has its piston rod 72 connected with an extension 73 of the arm 66 for actuating said arm. In order to permit the axial or elevational displacements of the spindle 9 in dependence on the elevational movements effected by the cam mechanism 28 without any disturbances of or by the belt and pulley transmission 23 (not shown in FIGURE 6) for rotating the spindle 9, the pulley 25 can be mounted displaceable on the spindle 9 by suitable means, or the belt 24 of the belt and pulley transmission 23 can be arranged to be slackened or stretched automatically by a bias (not shown). Another possibility is to mount the motor 22 on a slide 22' which is slidably mounted on the frame 1 for vertical movements thereon within the limits set by the vertical movements required by the spindle 9. The slide 22' is schematically illustrated in FIGURE 3 by broken lines and may be displaceable by the cylinder 71 or by the spring 60. Limit switches such as switches 74, 75, 76 may be mounted upon the cam disk 44 and may be arranged to be controlled by abutments (not shown) on the cam 64 or on the frame 1 for controlling the fluid systems including cylinders 18 and 32 through suitable solenoid valves (not shown) and for controlling the spindle drive motor 22. Such arrangements of switches, abutments and valves are well known in the art and are therefore not shown in detail, but it is understood that at least one limit switch 74 may control the operation of the cylinder 18 to bring said cylinder 18 to move the clamping means 19 out of engagement with the shoe 21 when the cam disk 44 approaches the end of a full turn, while one switch 75 may be arranged to stop the drive motor 35 and one switch 76 may operate to return the piston in the cylinder 32. Further limit switches may be supported on the disk 44 for coordinating or combining further operations with the form milling operation, such as finishing treatments of the shoe sole and heel, ejection of the finished shoe, etc.

The cam means 64 on the disk 44 can be formed integrally with the disk or may consist of an exchangeable annular cam ring secured to the disk 44. It lies in the scope of the invention to use a single disk 44 or cam means 64 of the cam mechanism 18 for effecting the controlled elevational movements of the spindle 9 and tool 8 for shoes of a certain model but within a wide range of sizes, and such single cam disk 44 or cam means 64 may also be used for different types of shoes provided that they do not differ too much from each other.

The template support 6 for controlling the lateral movement of the shoe table 3 has at its underneath side means such as guide pins 77 and a threaded bolt with a fly nut 78 mounted thereon to permit easy shifting of the exchangeable template 7, whereby any suitable number of templates 7 can be used for shoes within the range of the models and sizes to be worked in the machine. The table 3 on its upper side supports pins 79 corresponding to the pins 77 for securing a template 80 corresponding to the template 7 and serving as an abutment for the positioning means 20 to cause the latter, by engagement with the template 80, to center the shoe 21 in an exact position on the table 3. The template 80 can be made of any suitable material, for example a piece of rigid plastic which can be milled to the same form as the template 7 by means of the milling device 8.

As diagrammatically illustrated in FIGURE 3 and as mentioned above, the positioning and clamping device 16 includes two fluid operated cylinders 18, 17 for operating the positioning means 20 and clamping means 19, respectively. The clamping means 19 comprises at least one clamping member 19' secured to the piston rod 18' of the cylinder 18 which is mounted at the end of the upper arm 15 of the cantilever structure 2 alongside the cylinder 17 which is adapted to operate the positioning means 20. Upon activating the cylinder 18 to move the piston rod 18' downwardly the clamping member 19 is pushed down into engagement with a suitable last inserted in the shoe 21. The clamping means 19 may have another clamping member 19" to assist the clamping member 19' in holding the shoe 21 with its sole and heel firmly pressed to the table 3 by acting upon the toe portion of the shoe, as shown in FIGURE 3. The positioning means 20 may have the form of a scissors-type gripper with a pair of gripper shanks 20' the upper end portions of which are arranged substantially as a parallelogram linkage connected to the piston rod 17' of the cylinder 17. In the embodiment shown in FIGURE 3 the piston rod 17' contrary to the piston rod 18' of the cylinder 18 is directed upwardly. Each of the two gripper shanks 20' at the free end has a gripping member 20" formed in such a way that by activating the cylinder 17 for closing the shanks it can be brought into engagement with the back and front of the shoe 21 and with the edge of the template 80 at the front and back thereof to position the shoe on the table 3.

As pointed out above, electrical and fluid operated systems including valves and switches to activate electrical motors and fluid operated cylinders, such as the cylinders 17, 18, 32, in timed relation with operational steps during a machine working program are well known in the art and do not per se form part of this invention. Although not shown in the drawings, it will be apparent to those skilled in the art that such means will include a manually operated valve or a solenoid valve (not shown) electrically operated by means of a pushbutton switch S17 for supplying the cylinder 17 with operating fluid, such as compressed air, from a suitable supply so that the cylinder 17 operates to bring the positioning means 20 to position the shoe 21 on the table 3 as described above.

The piston rod 17' when it reaches its outer limit operates an abutment A18 of a limit switch S18 mounted on the upper arm 15 and adapted, by activating a solenoid valve (not shown), to supply the cylinder 18 with operating fluid, preferably from the same supply as that used for supplying the cylinder 17, so that this cylinder is brought to operate the clamping means 19 for securing the shoe 21 when placed in the right position on the table 3 by the positioning means 20. This movement of the clamping means 19 serves to activate another feed valve in a supply line to the cylinder 17, for example by mechanical engagement with an operating means on that valve or electrically via a limit switch S17' as shown in FIGURE 3, so that the operating fluid is supplied to the cylinder 17 for moving the piston in the latter inwardly of the cylinder, whereby the gripper shanks 20' connected to the piston rod 17' are separated from the shoe 21 which is maintained in position by the clamping means 19. This separating movement of the shanks 20' serves to operate a limit switch (not shown) which is mounted on the frame 1 and is adapted to start not only the drive motor 22 for rotating the spindle 9 but also the table drive motor 35 for rotating the table 3 and the synchro motor 42 and at the same time, through a solenoid valve (not shown), to activate the cylinder 32 which then operates to swing the cantilever structure or arm 2 in the direction towards the tool 8 to engage the tool with the edge of the sole or heel of the shoe 21. Thus all preparatory steps necessary for the machining operation on the shoe 21 and for starting this operation are initiated by the manual operation of the pushbutton switch S17. When the machining operation is completed after a full turn of the table 3 the limit switch 74 on the cam disk 44 is operated by engagement with an abutment (not shown) placed in a fixed position relative to the frame 1 to cause the cylinder 32 to swing the arm 2 away from the tool 8 and to bring the cylinder 18 to retract the clamping means 19 and to stop the drive motors 22 and 35 and thereby the synchro motors 42 and 43. While the spindle 9 preferably is to be stopped automatically at the completion of a machining operation by deactivating the motor 22 the spindle may if desired be driven continuously.

It is assumed that a form milling operation as initiated by manual operation of the switch S17 is to be carried out on a shoe provided with a sole and heel integrally connected by an intermediate instep portion to one single blank of a material such as rubber, which blank in a pre-operational step has been bonded to the bottom of the shoe 21. A suitable template 7 for the lateral control of the table 3 is clamped on the template holder 6 and a template 80 fixed on the table 3. When the shoe 21 is placed on the table 3 in an approximate position in relation to the last mentioned template 80 the switch S17 is operated and initiates thereby the steps described above for positioning the shoe in an exact position, clamping the shoe on the table, retracting the positioning means, starting the motors 22, 35, 42 and 43 and moving the arm structure 2 with the table 3 to the position in which the tool 8 engages the edge of the sole or heel of the shoe. The drive motor 35 when started for rotation of the table 3 also drives the synchro motor 42 which in turn drives the synchro motor 43. The latter drives the cam mechanism 28 which is forced to follow the rotary movement of the table for the controlled elevational movement of the spindle 9 and tool 8, whereby the milling tool 8 is set in an exact elevation already at the first engagement with the sole or heel. However, it may be suitable to arrange the setting in such a way that the first engagement and the interruption of the engagement always occurs at the same place, for example at the toe portion of the sole, which simplifies the control effected by the limit switches. The cam member of the cam mechanism 28 has such a profile that the spindle 9 when the tool 8 approaches the heel is quickly moved axially downwards so that a truncated portion 8" of the tool 8 (FIGURE 6) is brought into operation. When the tool 8 has passed the marginal portion of the heel the spindle is quickly returned upwards so that a cylindrical portion 8' thereof engages the sole. Thus the cam mechanism 28 assures that the tool 8 follows the sloped contour of the workpiece during the working operation thereof and that the cutting is effected in an exact manner and to an exact extent, and tanks to the contour shape of the tool 8 with a truncated portion 8" and a cylindrical portion 8', as shown in FIGURE 6, it is unlikely to damage the upper leather of the shoe. This shape further assures the desired oblique contour of the back and sides of the heel portion. The tool 8 is secured to the spindle 9, e.g. by means of a centre screw (not shown), to make for easy exchangeability.

The machine may be provided with other working tools in addition to the milling tool 8. Thus, in FIGURE 3, a tool 100 is provided for cutting a bevel in the upper portion of the edge of the sole and, if desired, of the heel of the shoe 21. This tool 100 may be a milling tool of small diameter supported by a spindle 101 which may be arranged to be driven by the drive motor 22 for the spindle 9 and may have a coupling 103 which permits raising and lowering of the upper part thereof against a spring load, and the tool 100 may have at its upper end a guiding end flange for the purpose of controlling the elevational position of the tool 100 by engagement with the sole. Further, a nozzle 102 may be provided and arranged to follow the bevel milling tool 100. Said nozzle which may be secured to the machine frame 1 is connected to a supply and adapted to spray paint on the milled surfaces. In lieu of a nozzle 102 any suitable means for application of paint to said surfaces may be used.

FIGURE 5 illustrates a modification of the device in FIGURE 4. The template 7 is here placed upon the table 3 and supports a plate 6' which in turn supports the shoe 21. The positioning means 20 is shown in position with the grippers in abutment with the shoe 21 and template 7 which serves as a reference for the exact positioning of the shoe on the support plate 6'. In FIGURE 5 a cylindrical tool 8a is shown in one working position.

The tool 8a is shown by full lines in working position in FIGURE 5 and is shown in another working position by dash lines. The operation of the tool 8a in these two different angular positions corresponds to the operation of the tool 8 with its portions 8' and 8", respectively.

In the modification shown in FIGURE 7 the rotary spindle 9 is mounted in a bearing housing which is generally designated 110. The bearing housing 110 is secured to a substantially horizontal cradle 111 with a downwardly facing circular surface which is slidably supported on a slide guide 115. The slide guide 115 is secured to the machine frame 1 and the cradle 111 is secured to a vertical slide 114 which is displaceable in opposite vertical directions guided in grooves 112 in the machine frame 1. The bearing housing 110 with the spindle 9 is vertically movable by means of the slide 114 and is supported by the cradle 111 for oscillatory movement on the slide guide 115 with a point P on the top edge of the working side of the tool 8a as a center of the oscillatory movement, as indicated by dash lines for the tool 8a in FIGURE 7.

Thus elevational movement of the tool 8a is made possible by the fact that the bearing housing 110 is supported on the slide 114 which is displaceable on the frame 1 in vertical direction along the guiding grooves 112. The slide 114 rests upon a spring 116 which is interposed between a bracket 117 secured to the machine frame 113 and a plate 118 secured to the lower end portion of the slide 114. The plate 118 which is connected with the slide 114 by a rod 119 secured to and depending from a bracket 120 fixed to the slide 114 is displaceable in a casing 121 which is secured to the bracket 117 and surrounds the spring 116. The spring 116 tends to displace the slide 114 upwardly in order to engage a cam follower roller 122 mounted on a rod 122' extending from the slide 114 with an annular cam member 123 depending from an elevational control template 124 of the cam mechanism 28, which template is secured to the output shaft 67 of the synchro motor 43 (FIGURES 3 and 4).

Due to the spring load the roller 122 is always kept in contact with the cam member 123. Guiding of the bearing housing 110 for the oscillatory movement thereof on the guide member 115 and thus angular adjustment of the milling cutter 8a is realized by the cam mechanism 28 which to this end also includes cam means 125 which is equipped with an internally and externally profiled cam ring 126 of uniform thickness and which is rotatable by the shaft 67 of the synchro motor 43 and positively operates between two cam rollers 128 mounted on a projection 127 of the bearing housing. Said guiding device operates in synchronism with the elevational control. To maintain the cam rollers in engagement with the cam ring 126 independently of the movement of the slide 114 the rollers are mounted on shafts 129 which are movable in sleeves 130 attached to the projection 127, the cam rollers 128 engaging in a groove in the cam ring 126 and being thereby maintained in engagement with the latter. The cam ring 126 of uniform thickness but of arcuate shape will thus effect a positive angular adjustment of the milling cutter 8a about point P independently of the elevational adjustment of the cutter, which is controlled by the elevational control. The cam rollers 128 and the groove in the cam ring 126 have spherically rounded surfaces to permit the change, brought about by the lateral control, of the angular positions of the cam rollers 128.

The cam rings 123 and 126 are exchangeable to fit the handled shoe models, and the milling cutter 8' is driven in the conventional manner by belt transmission. The pulley on the spindle 9 is shown at 25.

By said combined control devices 125, 130 the milling cutter 8a is controlled by vertical shifting movement of the slide 114, the angular position of the cutter relative to the sole and heel of a shoe supported on the table 3 being controlled not as in the embodiment in FIGURE 4 by causing two different operating surfaces 8', 8" of the cutter to engage, but by continuously adjusting the cylindrical cutter 8a by a swinging movement of the bearing housing 110 and thus of the spindle 9 with point P of the cutter as a center of pivotment into the correct angular position for the sole and heel profiles intended by means of the control device 28 which thus constitutes a contour duplicating device.

A further modification of the control means for the spindle 9 is shown in FIGURE 8. These means are similar in essential details to the arrangement of FIGURE 7 and therefore the same reference numerals are used in FIGURE 8 for details equivalent to those in FIGURE 7. The spindle 9 is supported by a bearing housing 110 which as a cradle is tiltably mounted on guide means which includes an upper roller 200 and a pair of lower rollers 201. The upper roller 200 is supported on a circular guide surface 202 and the lower rollers 201 bear against a lower circular guide surface 203, respectively, of a guide means 111 which is supported by the slide 114. The slide 114 consists in the modification of FIGURE 8 of a pair of sleeves 205 which are fixed to the guide means 111 and are guided on vertical guide rods 206 fixed to the machine frame 1. The means for transmitting the elevational movement for the elevational control of the bearing housing 110 with the spindle 9 consist of an arm 122' that supports the cam follower roller 122 in engagement with the elevational control cam disk 123 and is connected to the slide 114. The control mechanism for the tilting movement of the spindle 9 with the point P as a center includes the cam disk 125 which by means of the cam follower roller 128 and a mechanical transmission means 207 controls the vertical movements of the bearing housing 110. A preload 208 cooperates with the cam mechanism 125, 128 and the transmission means 205 for maintaining the cam roller 128 in engagement with the cam disk 125, as is diagrammatically shown in FIGURE 8.

Further modifications of the details of the control means and the means for transmitting the movement to the spindle 9 are possible within the scope of the invention, as will readily be realized by those skilled in the art. Another modification is to support the rotary table vertically movable relative to the tool, in which case the devices for supporting the table for elevational adjustment relative to the tool can be designed in fundamentally the same way as the described devices for the elevational adjustment of the spindle. In the latter case the table shall thus be rotated and elevationally adjusted and if needed inclined during the working cycle, while the spindle need only be rotated, although the device described is preferred.

The apparatus described in the foregoing can be connected, by slightly modifying it, to a feed mechanism which in a factory for the continuous manufacture of shoes supplies said shoes in step with the manufacture to the work table 3 where they are automatically oriented in correct position and fixed with the air of the shoe holder means 16.

What I claim and desire to secure by Letters Patent is:

1. In a milling machine having a spindle rotatably supported by the machine frame, a tool supported by the spindle for performing a form milling operation on a workpiece, a work table rotatably supported by the machine frame for supporting the workpiece, supporting means for supporting the table and the spindle movably in relation to each other, said supporting means comprising axial guide means for the spindle, and control means including drive means and rotatable template means for effecting controlled rotational movements of said table and for bringing the tool supported by the spindle in controlled engagement with the workpiece for effecting a form milling operation thereon in dependence on the contour of the template means and thereby in coordination with the rotation of the table, said template means including cam means for coordinating the rotary movement of the work table and axial movement of the spindle in dependence on the rotational movement of the template means.

2. In a milling machine having a spindle rotatably supported by the machine frame, and a tool supported by the spindle for performing a form milling operation on a workpiece, a work table rotatably supported by the machine frame for supporting the workpiece, and a device for clamping the workpiece on the table, supporting means for supporting the table and the spindle movably in relation to each other, and control means including drive means and template means for effecting controlled rotational movements of said table and for bringing the tool supported by the spindle in controlled engagement with the workpiece for effecting a form milling operation thereon in dependence on the contour of the template means and thereby in coordination with the rotation of the table, said supporting means comprising axial guide means for the spindle and said control means comprising rotatable template means with cam means for coordinating the rotary movement of the work table and axial movement of the spindle in dependence on the rotational movement of the template means.

3. In a milling machine having a spindle rotatably supported by the machine frame, and a tool supported by the spindle for performing a form milling operation on a workpiece, a work table rotatably supported by the machine frame for supporting the workpiece, and a device for clamping the workpiece on the table, supporting means for supporting the table and the spindle movably in relation to each other and control means including drive means and template means for effecting controlled rotational movements of said table and for bringing the tool supported by the spindle in controlled engagement with the workpiece for effecting a form milling operation thereon in dependence on the contour of the template means and thereby in coordination with the rotation of the table, said control means further including rotary cam means, cam follower means, and spring means urging the cam follower means engaged with said cam means.

4. In a milling machine having a spindle rotatably supported by mounting means connected with the machine frame, a tool supported by the spindle for performing a form milling operation on a workpiece, a work table rotatably and transversally movably supported by supporting means connected with the machine frame for supporting the workpiece and moving said workpiece transversally in the direction of the tool, a device for clamping the workpiece on the table, said mounting means comprising a spindle support which is movably supported in relation to the table, drive means for rotating the spindle and for rotating the table, template means rotatably supported by the machine frame and arranged to be driven by said drive means and connected by cam means to said table supporting means and to said spindle support to cause a form milling operation to be effected by coordinating the rotational and bodily movements of the table with the movement of the spindle support in dependence on the rotational movement of said template means.

5. A milling machine as claimed in claim 4, in which said drive means include an electric synchro motor which is connected to and controlled by another synchro motor which in turn is mechanically connected to an electric drive motor for the work table.

6. A machine as claimed in claim 1, in which the tool has working surfaces which lie in axial succession and make different angles with the longitudinal axis of the spindle and which are adapted to be individually moved into engagement with the workpiece in dependence on axial displacement of the spindle in order alternatively to engage the workpiece with working surfaces having different inclinations in relation to each other.

7. A machine as claimed in claim 1, in which the axially outer end portion of the tool is frustoconical with the slender end outermost for form contouring part of the workpiece, while the axially inner portion of the tool for contouring another part of the workpiece is substantially cylindrical.

8. In a milling machine having a rotatable spindle, a tool supported by the spindle for performing a form milling operation on a workpiece, an a work table rotatably supported by the machine frame for supporting the workpiece, a device for clamping the workpiece in position on the table, said spindle being rotatably mounted in a spindle support which is immovably supported by the machine frame to support the spindle displaceably in relation to said table, control means including drive means and template means with cam means rotatably mounted and adapted to effect controlled rotational movements of said table in dependence on the rotary movement of the template and cam means and to bring the tool supported by the spindle in controlled engagement with the workpiece for effecting a form milling operation thereon in dependence on the contour of the template means, said spindle support comprising a bearing housing with means pivotally supported by slide means slidably supported by guide means connected to the machine frame, said bearing housing and slide means being connected to said control means and said control means being adapted to adjust the axial and angular position of the tool in relation to the workpiece by adjusting the axial position of said slide means and angular position of said bearing means in coordination with the rotation of the work table during a complete turn of said table in a working operation.

9. A machine as claimed in claim 8, in which the pivotally supported bearing housing is supported by a guide having at least one circular guide surface on the slide engaged by a corresponding circular guide surface on said bearing housing, said circular guide surfaces having a common center on said tool.

10. A machine as claimed in claim 9, in which said circular bearing surfaces have their common center located at a point P of the tool at the outer edge of the tool on the side thereof facing the work place.

11. A machine as claimed in claim 1, including a further tool on a further rotary spindle which is adapted to follow the milling tool to cut a chamfer on one edge of said sole and heel.

12. A machine as claimed in claim 1, including means following upon the milling tool and serving to apply paint to the edges of the sole and heel of a shoe during form milling.

13. A machine as claimed in claim 1, including means for positioning a shoe in correct location on the work table, and means for clamping the shoe in position.

14. In a milling machine having a spindle which is rotatable in mounting means supported by the machine frame, a tool supported by the spindle for performing a form milling operation on a workpiece, a work table rotatably mounted in a support which is pivotally connected with the machine frame for moving the work table transversally in the direction of said tool and means for clamping the workpiece in position on the work table for a working operation, said mounting means comprising slide means slidably supported by guide means secured to the machine frame and a spindle bearing housing which is movably supported by said slide means, said slide means and bearing housing having corresponding arcuate guide means with a common center on said tool for supporting said bearing housing tiltable on said slide means for tilt-slide means and tilting movement of the bearing housing in a manner such that the movement of the slide means ing movement about said common center, and control means including template means and cam means for effecting controlled rotational movement of the work table in a work position thereof with the workpiece engaged by the tool and for controlled movement of the and tilting movement of the bearing housing are coordinated with the rotation of the work table for angularly and axially adjusting the tool in dependence on the angular position of the work table.

References Cited

UNITED STATES PATENTS

| | | | |
|---|---|---|---|
| 2,040,756 | 5/1936 | Morrill | 12—86.7 |
| 2,126,802 | 8/1938 | Nutt | 12—73.5 |
| 2,287,054 | 6/1942 | Nokes | 12—73.5 |
| 2,359,395 | 10/1944 | Stacey | 12—86.7 |
| 3,134,998 | 6/1964 | Kunze et al. | 12—86.7 |

PATRICK D. LAWSON, Primary Examiner